US009346331B2

(12) United States Patent
Lundberg et al.

(10) Patent No.: US 9,346,331 B2
(45) Date of Patent: May 24, 2016

(54) BEAD SEATER SUPPLY LINE ACCESSORY

(71) Applicant: Bosch Automotive Service Solutions Inc., Warren, MI (US)

(72) Inventors: Dyland Lundberg, Faribault, MN (US); Jose Barrios, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 225 days.

(21) Appl. No.: 13/750,633

(22) Filed: Jan. 25, 2013

(65) Prior Publication Data

US 2014/0048216 A1 Feb. 20, 2014

Related U.S. Application Data

(63) Continuation-in-part of application No. 13/588,839, filed on Aug. 17, 2012.

(51) Int. Cl.

| | |
|---|---|
| ***B60C 25/12*** | (2006.01) |
| ***F16L 25/00*** | (2006.01) |
| ***B60C 25/14*** | (2006.01) |
| ***F16L 41/02*** | (2006.01) |
| ***F16K 31/60*** | (2006.01) |
| ***F16K 1/34*** | (2006.01) |

(52) U.S. Cl.

CPC ............... *B60C 25/12* (2013.01); *B60C 25/145* (2013.04); *F16K 1/34* (2013.01); *F16K 31/602* (2013.01); *F16L 25/00* (2013.01); *F16L 41/021* (2013.01); *Y10T 137/0447* (2015.04); *Y10T 137/9029* (2015.04)

(58) Field of Classification Search

CPC ...... B60C 25/12; B60C 25/145; B60C 25/14; F16L 25/00; F16L 25/0081; F16L 25/009; F16L 19/00; F16L 19/42; F16L 41/021

USPC .......................................... 157/1.1, 1.17, 1.2

See application file for complete search history.

(56) References Cited

U.S. PATENT DOCUMENTS

| | | | | |
|---|---|---|---|---|
| 290,446 | A * | 12/1883 | McConnell | 285/133.4 |
| 2,544,556 | A * | 3/1951 | Kunert | 251/155 |
| 2,850,298 | A * | 9/1958 | Clark | 137/614.03 |
| 3,683,991 | A * | 8/1972 | Ruhland et al. | 157/1.1 |

(Continued)

OTHER PUBLICATIONS

Special Tools/A/C Tools/Electronic Diagnostic/Shop Equipment—SPX. For more information, visit www.octools.com, Mar. 2012.

(Continued)

*Primary Examiner* — Hadi Shakeri
(74) *Attorney, Agent, or Firm* — Baker Hostetler LLP

(57) ABSTRACT

A pneumatic connector is provided. The pneumatic connector includes: a body having two ends; a first connecting structure at one end of the body; a second connecting structure at the other end of the body, wherein the first and second connecting structures are substantially in line with each other; and a third connecting structure located in between the first and second connecting structures at an angle that is not in line with the first and second connecting structures, wherein the first second and third connecting structures are fluidly connected to an interior of the body, wherein the first, second and third connecting structures are adapted to permit substantially leak free connections between pneumatic components. A method of creating an accessory connection for a bead seater is provided.

13 Claims, 9 Drawing Sheets

310
100
304
40
309
300
306
308
30
302

(56) References Cited

U.S. PATENT DOCUMENTS

| | | | | | |
|---|---|---|---|---|---|
| 3,814,163 | A | * | 6/1974 | Charles et al. | 157/1.1 |
| 3,866,654 | A | | 2/1975 | Duquesne | |
| 4,784,412 | A | * | 11/1988 | Van Dongen | 285/133.4 |
| 5,570,733 | A | * | 11/1996 | Desparois et al. | 157/1.1 |
| 5,668,314 | A | * | 9/1997 | Jones | 73/129 |
| 5,878,801 | A | * | 3/1999 | Ellis | 157/1.1 |
| 5,884,659 | A | | 3/1999 | Prosser et al. | |
| 8,733,419 | B2 | * | 5/2014 | White | 157/1.1 |

OTHER PUBLICATIONS

United States Office Action dated Apr. 9, 2015, in U.S. Appl. No. 13/588,839.

* cited by examiner

BEAD SEATER SUPPLY LINE ACCESSORY

CROSS-REFERENCE TO RELATED APPLICATIONS

This application claims priority to and is a continuation-in-part, of U.S. patent application entitled, "High Volume Air Valve for a Tire Bead Tool", filed Aug. 17, 2012, having a Ser. No. 13/588,839, now pending the disclosure of which is hereby incorporated by reference in its entirety.

FIELD OF THE DISCLOSURE

The disclosure generally relates to tire bead seating tools, and, more particularly, to methods and systems for seating a tire bead onto a bead area of a wheel or rim using a high volume air valve.

BACKGROUND OF THE DISCLOSURE

A tire bead is an important structural component of many tires. The tire bead is typically the inner most edge of the inner and outer sidewalls of a tire. When the tire is mounted on a wheel (or rim), these portions of the tire are in direct contact with the wheel (or rim). Particularly in tubeless tires, for example, the tire bead couples with the wheel structure to form an air-tight seal so that an interior pressure chamber may be maintained between the tire and the wheel. The tire may thus be inflated with air, nitrogen, or any other suitable gas, typically via a conventional valve stem. The interior pressure chamber is maintained at a desired pressure, which, in turn, exerts an outwardly directed force against the tire bead to assist in maintaining the air-tight seal.

Due to the strength and rigidity imparted to the sidewalls of many of today's tires, particularly larger automobile and/or truck tires, for example, it is often difficult to mount a tire onto the wheel so that the tire bead properly seats onto or against a bead area to form the air-tight seal. Accordingly, mounting a tire often involves a secondary step of specifically seating the tire bead. One conventional method for seating the tire bead involves using a special pneumatic seating tool that injects high pressure air into a gap between the loose tire and the wheel structure. The sudden influx of pressurized air into the internal pressure chamber forces the sidewalls to quickly expand and/or snap the tire bead into position onto or against the bead area of the tire structure, thus creating the air-tight seal. The internal pressure chamber may then be inflated with air to the desired pressure.

Conventional pneumatic seating tools may rely on a ball valve to discharge pressurized air from a pressurized air tank, for example. However, the motion required to quickly open and/or close these valves often causes the nozzle to lift off of the wheel, resulting in a significant loss of control over the bead seating process. Other conventional pneumatic seating tools automatically discharge a predetermined volume of air in a single blast, regardless of the tire size to seat. Thus, pressurized air is often wasted when these tools are used to seat normal or smaller sized tires, the larger than required volumes of air draining the tank much more quickly than would otherwise be necessary.

It may be helpful to provide a high volume air valve for a tire bead tool that provides a quick and accurate airflow discharge in easily controlled bursts.

SUMMARY OF THE DISCLOSURE

The foregoing needs are met by the present disclosure, wherein according to certain aspects, a pneumatic connector is provided. The pneumatic connector includes: a body having two ends; a first connecting structure at one end of the body; a second connecting structure at the other end of the body, wherein the first and second connecting structures are substantially in line with each other; and a third connecting structure located in between the first and second connecting structures at an angle that is not in line with the first and second connecting structures, wherein the first second and third connecting structures are fluidly connected to an interior of the body, wherein the first, second and third connecting structures are adapted to permit substantially leak free connections between pneumatic components.

In accordance with another aspect of the present disclosure, a method of creating an accessory connection for a bead seater is provided. The method includes: providing a connector having a first and second connecting structure substantially aligned with each other; providing a third connecting structure located in between the first and second connecting structure and at an angle so as to not be in line with the first and second connecting structure; and fluidly connecting all three connecting structures.

In accordance with yet other aspects of the present disclosure, a pneumatic connector is provided. The pneumatic connector includes: a body having two ends; a first connecting structure at one end of the body; a second connecting structure at the other end of the body, wherein the first and second connecting structures are substantially in line with each other; and a third connecting structure located in between the first and second connecting structures at an angle that is not in line with the first and second connecting structures, wherein the first, second, and third connecting structures are fluidly connected to an interior of the body, wherein the first, second, and third connecting structures include threads and are adapted to permit substantially leak free connections between pneumatic components.

There has thus been outlined, rather broadly, certain aspects of the present disclosure in order that the detailed description herein may be better understood, and in order that the present contribution to the art may be better appreciated.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

Figure 1:
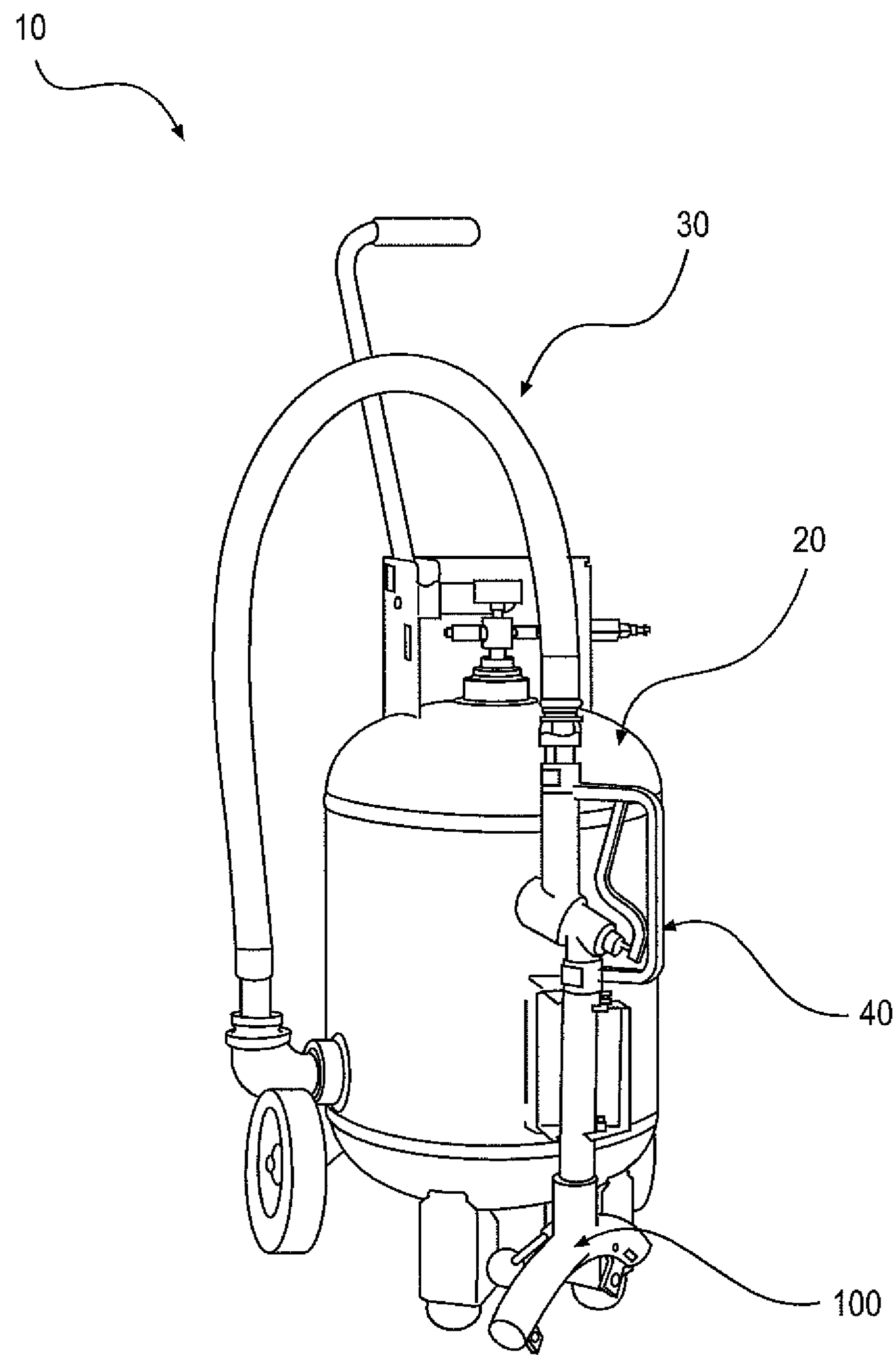
FIG. 1 is a perspective view of a bead seating system, in accordance with aspects of the present disclosure.

Embodiments in accordance with the invention will now be described with reference to the drawing figures, in which like reference numerals refer to like parts throughout.

Various aspects of methods and systems for seating a tire bead onto a bead area of a wheel or rim may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of an electric strike assembly in addition to the orientation depicted in the drawings. By way of example, if aspects of methods and systems for seating a tire bead onto a bead area of a wheel or rim shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

FIG. 1 depicts a bead seating system 10 according to an exemplary embodiment. The system 10 may include a storage tank 20 for storing a compressed fluid, such as pressurized air. A fluid conduit 30, such as a rubber or plastic hose, for example, may provide fluid communication from the storage tank 20 to a valve assembly 40. The valve assembly 40 may, in turn, control a fluid flow to a bead seating tool 100. The bead seating tool 100 may be similar to the bead seating tool shown and described in U.S. patent application Ser. No. 13/081,129, now U.S. Pat. No. 8,757,236, incorporated herein by reference in its entirety. Other embodiments may use different types of bead seating tools 100.

Figure 2:
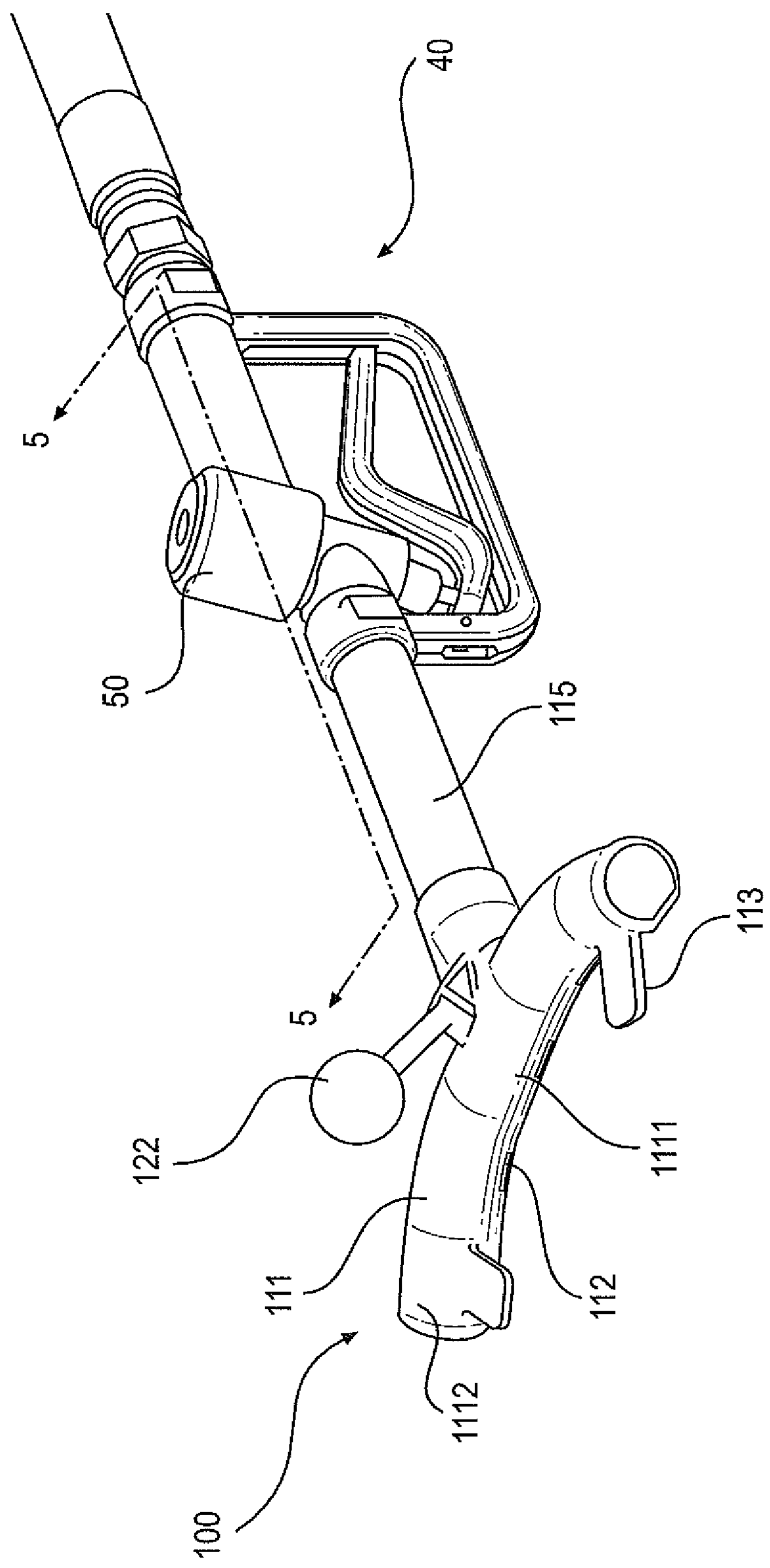
FIG. 2 illustrates components of a bead seating system, in accordance with aspects of the present disclosure.
Figure 3:
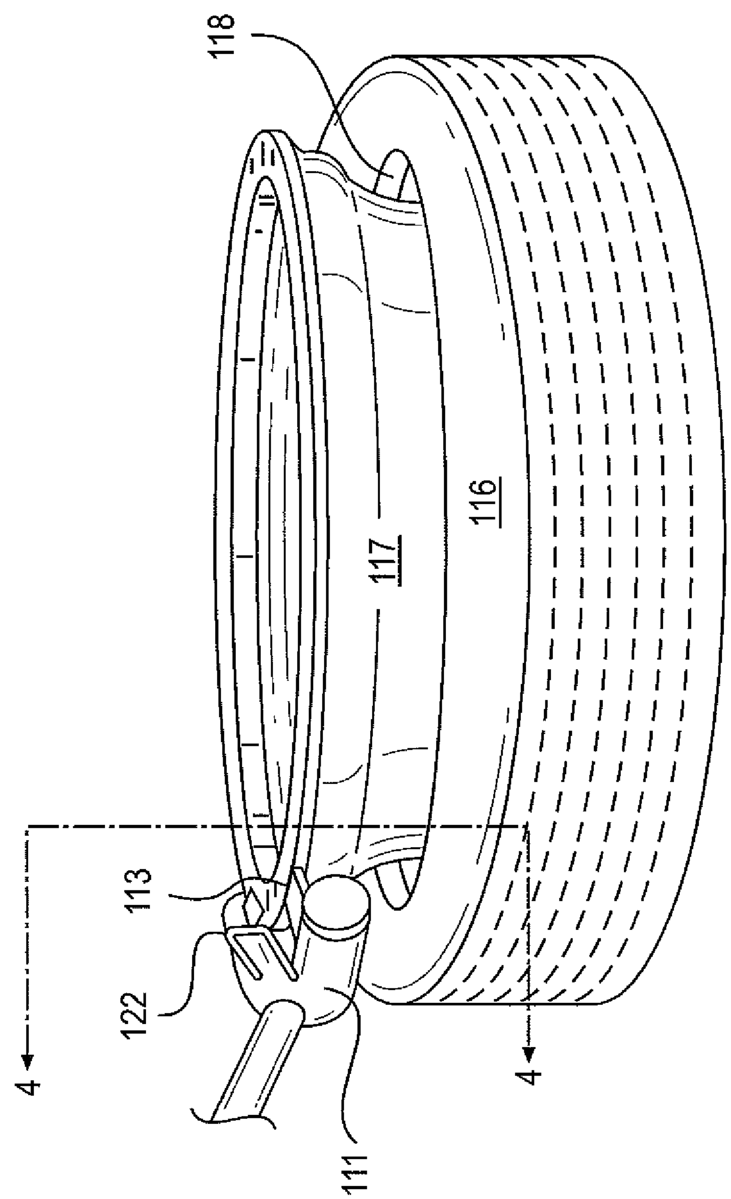
FIG. 3 illustrates aspects of a bead seating system as used for seating a tire on a rim, in accordance with aspects of the present disclosure.
Figure 4:
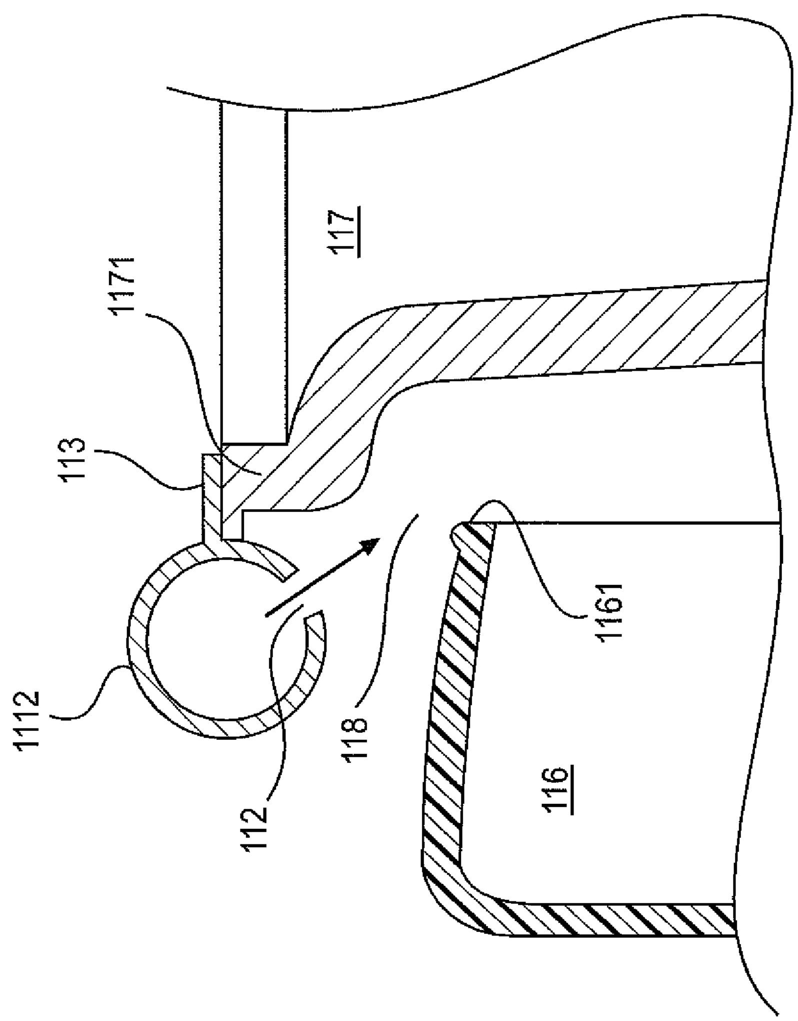
FIG. 4 illustrates a cutaway view of aspects of a bead seating system as used for seating a tire on a rim as seen along section line 4-4 in FIG. 3, in accordance with aspects of the present disclosure.

FIGS. 2-4 illustrate aspects of the bead seating system 10 and, in particular, how the system 10 may be used, for example, to seat a tubeless tire onto a rim. A body 111 of the bead seating tool 100 may be formed as a hollow bent pipe with a straight portion 1111 in the middle and bent portions 1112 at each end. This shape generally follows the curvature of a tire, but the total length of the bent pipe is such that the full length of the body 111 substantially fits in the gap between an unseated tire and rim.

FIGS. 3 and 4 show the body 111 positioned to seat a tire 116 on a rim 117. As shown, the protrusions 113 from the body 111 sit atop the rim 117. Holes 112 in the body 111 face the gap 118 between the tire 116 and the rim 117 may be positioned to vent a pulse of air into the gap 118 to seat the tire 116 on the rim 117, as shown by the arrow in FIG. 4.

FIG. 4 shows a cross sectional view of the tire 116 and rim 117 from FIG. 3, cut away at 4-4. As shown, the cross section is at a hole 112 of the body 111 below a protrusion 113 in one of the bent portions 1112 of the body 111. The protrusion 113 on the body 111 of the seating apparatus may be arranged on the rim 117 so that the holes 112 vent a pulse of air into the gap 118 as illustrated by the arrow. When the pulse of air is released through the hole 112 into the gap 118, the bead 1161 of the tire 116 rises in response to inflation of the tire 116 to fit onto the bead-seating surface 1171 of the rim 117.

As the pulse of air is vented from the plurality of holes 112 in the body 111 into the gap 118 between the tire 116 and the rim 117, a recoil effect may be felt by a user holding the seating tool 100, similar to the recoil of a gun, for example. To prevent this recoil (also referred to as blow back) against the user of the seating tool 100, the protrusions 113 can be placed on and pressed against the rim via force applied to a handle device 122 provided as part of the seating tool 100. This application of pressure by the user toward the gap can counteract the blow back effect.

As shown in FIG. 2, a pipe 115 may channel air from the valve assembly 40 into the body 111 of the seating tool 100. The valve assembly 40 of the present disclosure may include a flow control valve 50 that differs from the conventional ball valves used in the prior art.

Figure 5:
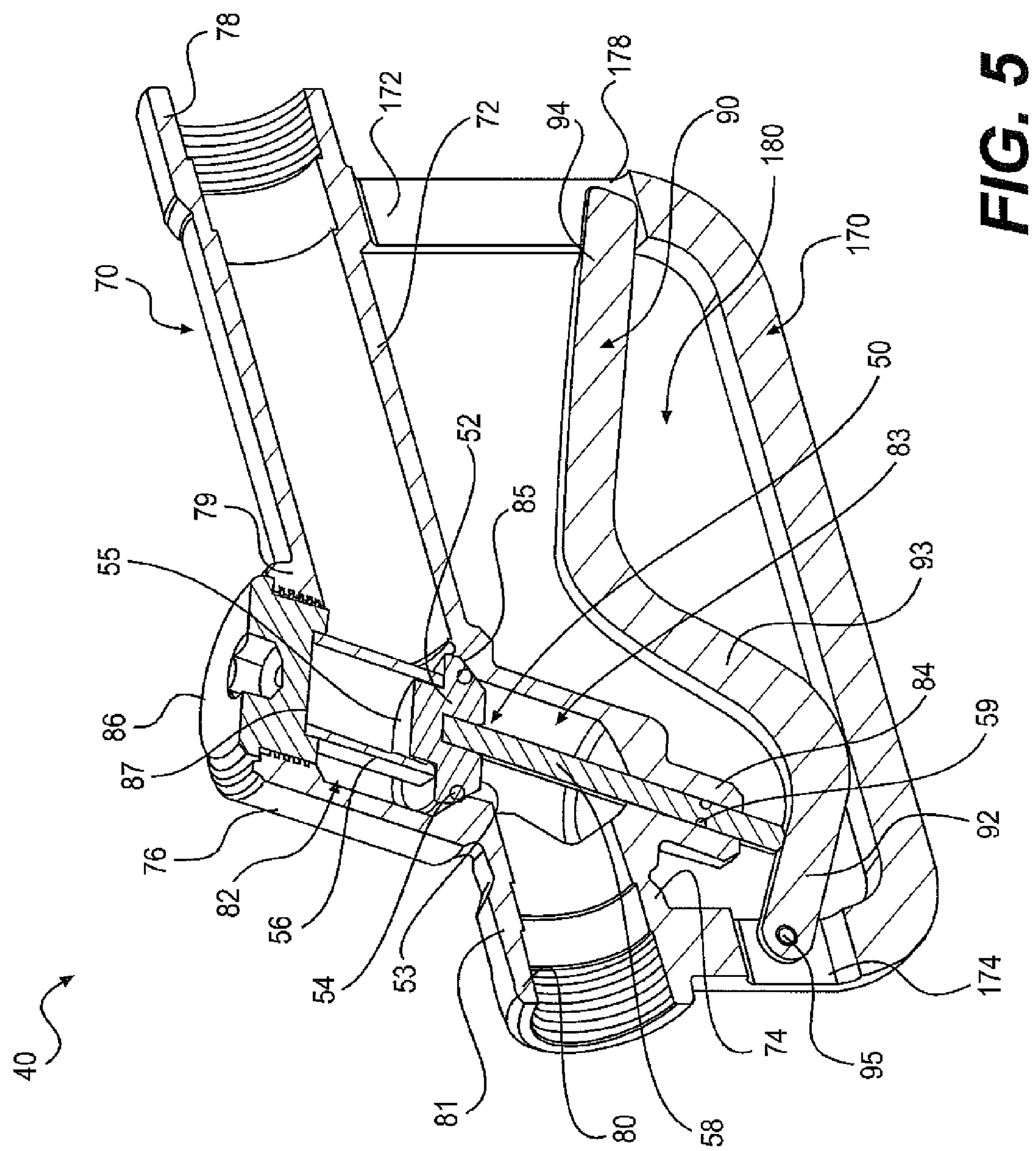
FIG. 5 illustrates a cutaway view of a valve assembly of a bead seating system as seen along section line 5-5 in FIG. 2, in accordance with aspects of the present disclosure.

As shown in FIG. 5, which is a cross-sectional view of the valve assembly 40 as cut away along line 5-5 in FIG. 2, the valve assembly 40 includes the flow control valve 50, a body structure 70, and an actuation control, such as a handle 90, for providing precise, tactile control over the airflow through the body structure 70.

The body structure 70 of the valve assembly 40 may be configured with a proximal inlet tube 72 and a distal outlet tube 74 separated by a valve cylinder portion 76. The proximal inlet tube 72 and the distal outlet tube 74 may be arranged substantially parallel with offset axes in the longitudinal direction. A first end 78 of the proximal inlet tube 72 may be open and formed with an expanded, internally threaded female portion for mating with an externally threaded male portion (not shown) of the fluid conduit 30. Other suitable structure for mating the valve assembly 40 to the fluid conduit 30 may also be used.

A second end 79 of the proximal inlet tube 72 may open into the valve cylinder portion 76. The distal outlet tube 74 may have an open outlet end 80 formed with an expanded, internally threaded female portion for mating with the seating tool 100 via the pipe 115. Other suitable structure for mating the distal outlet tube 74 to the seating tool 100 via the pipe 115 may also be used. The opposite end 81 of the distal outlet tube 74 may open into the valve cylinder portion 76 at a location on the diametric opposite side of the valve cylinder portion 76 from where the second end 79 of the proximal inlet tube 72 opens into the valve cylinder portion 76. The proximal inlet tube 72, distal outlet tube 74 and valve cylinder portion 76 define an airflow pathway for providing fluid communication from the fluid conduit 30 to the seating tool 100.

The valve cylinder portion 76 of the body 70 may include an upper valve chamber 82 having a first internal diameter and a lower valve chamber 83 having a second internal diameter smaller than the first internal diameter of the upper valve chamber 82. A step 85, which may be beveled as shown in FIG. 5, may thus be formed at the internal junction of the concentrically arranged upper valve chamber 82 and lower valve chamber 83. The step 85 forms a valve seat for the valve or flow plug 52.

The flow control valve 50 may include a valve plug 52 slidably arranged inside the upper valve chamber 82 so that a lower surface 53 of the valve plug 52 seats against the step 85. Accordingly, the lower surface 53 may be beveled or otherwise contoured to match the contours of the step 85 so as to form an air tight seal when the valve plug 52 is seated against the step 85. In accordance with another aspect of the present disclosure, an o-ring seal 54, may optionally be mounted on the lower surface 53 to be compressed between and seal the junction of the valve plug 52 and the step 85.

A force generator 56, which may be a compression spring, for example, or any suitable device for biasing the valve plug 52 against the step 85, may be mounted between a valve cap 86 and the valve plug 52. In accordance with aspects of the present disclosure, the valve cap 86 may be formed with a mounting receptacle 87, for example, for mounting and retention of one end of the force generator 56. In accordance with another aspect of the present disclosure, the valve plug 52 may be formed with a mounting protrusion 55, for example, for mounting and retention of the other end of the force generator 56. In accordance with yet another aspect of the present disclosure, the valve cap 86 may be threaded to be received by a threaded upper portion of the valve cylinder portion 76. The valve cap 86 may thus provide easy access to the various components of the flow control valve 50 for assembly, maintenance and repair.

An actuator shaft 58 may be mounted to the valve plug 52 to extend through the lower valve chamber 83, exiting the valve cylinder portion 76 through an extended lower wall portion 84. In accordance with aspects of the present disclosure, the actuator shaft 58 may be integrally formed with the valve plug 52. The actuator shaft 58 slidably extends through the lower wall portion 84 to abut a distal portion 92 portion of the handle 90, the lower wall portion 84 providing stability, support, and guidance to the actuator shaft 58. One or more o-ring seals 59, for example, may be provided to further enhance the air tight properties around the actuator shaft 58.

As shown in FIG. 5, the valve cylinder portion 76 may be formed at an angle to the substantially parallel longitudinal axes of the proximal inlet tube 72 and the distal outlet tube 74. The actuator shaft 58 may thus extend at an angle from the lower wall portion 84 to abut the distal portion 92 of the handle 90 at or near a hinged mounting point 95 of the handle 90. As shown in FIG. 5, the angle may be approximately 70°, however, any suitable angle between about 10° and 90° may be formed, with a more acute angle enabling a more direct-line air flow to be formed between the proximal inlet tube 72 and the distal outlet tube 74.

The handle 90 may be rotatably mounted to a frame extension 170 of the body structure 70. The frame extension 170 may resemble a D-bracket, for example, with a first end 172 of the frame extension 170 connected to the proximal inlet tube 72 near the first end 78 of the proximal inlet tube 72 and a second end 174 of the frame extension connected to the distal outlet tube 74 near the open outlet end 80 of the distal outlet tube 74. The frame extension 170 may be integrally formed with the body structure 70 and/or be formed as a separate member that is removably attached to the body structure 70. The handle 90 thus occupies a space 180 between the body structure 70 and the frame extension 170.

In accordance with aspects of the present disclosure, the handle 90 may be s-shaped, with the distal portion 92 of the handle extending proximally from the hinged mounting point 95 at an obtuse angle from the longitudinal axes of the proximal inlet tube 72 and the distal outlet tube 74. A middle portion 93 of the handle 90 may be formed to connect the distal portion 92 of the handle 90 to a rear grip portion 94 of the handle 90. The rear grip portion 94 may be substantially parallel to the distal portion 92 and extend towards the first end 172 of the frame extension 170. A recess 178 may be formed in the first end 172 of the frame extension 170 that captures and retains the rear grip portion 94 of the handle 90. The recess 178 may further define an extent of rotation of the handle 90.

Due to the force exerted by the force generator 56 against the valve plug 52, the actuator shaft 58 exerts equal pressure against the handle 90 at the point where the shaft 58 abuts the distal portion 92 of the handle 90. Thus, in a rest position, the handle may be maintained substantially in the position shown in FIG. 5 with the valve plug 52 seated against the step 85 such that fluid communication between the proximal inlet tube 72 and the distal outlet tube 74 is prevented. To use the bead seating tool 100, a user may grasp the handle 122 of the seating tool 100 with one hand and grasp the valve assembly 40 with the other hand. The valve assembly 40 may easily be grasped with one hand by holding the proximal inlet tube 72 between a thumb and index finger, grasping the tube 72 with the thumb while extending the fingers of the same hand to grasp the rear grip portion 94 of the handle 90. The user may thus situate the bead seating tool 100 as described above with respect to FIGS. 3 and 4 so that the air holes 112 are positioned to dispense a blast of air into the gap 118. Because the valve assembly 40 of the present disclosure permits easy, one-handed operation of the flow control valve 50, the user may much more easily maintain pressure on the bead seating tool 100 during air dispensing, preventing kick-back of the tool while being able to maintain proper positioning.

With the seating tool 100 situated against the rim 117, the user may squeeze the rear grip portion 94 of the handle 90 causing the handle 90 to rotate about the hinged mounting point 95. The mechanical advantage gained by the configuration of the handle 90 ensures that the user is able to easily and effectively open the valve plug 52. When the user squeezes the handle 90, rotation about the hinged mounting point 95 causes the actuator shaft 58 to slide through the lower wall portion 84 so that the valve plug 52 overcomes the biasing force of the force generator 56 and dislodges from the step or seat 85.

The pressurized fluid delivered to the valve assembly 40 from the storage tank 20 via the fluid conduit 30 immediately rushes through the gap created between dislodged valve plug 52 and the step 85. The pressurized fluid flows through the gap, into the lower valve chamber 83, and into the distal outlet tube 74 to be delivered to the seating tool 100 via the pipe 115.

The user may easily control the amount of air flow delivered to the seating tool 100 by the amount of rotation of the handle 90 as well as the amount of time before the handle 90 is released, allowing the biasing force of the force generator 56 to force the valve plug 52 back into position, preventing further delivery of pressurized fluid to the seating tool 100.

As noted above, the configuration of the handle 90 permits a strong tactile feel and a greater degree of control by the user over delivery of the pressurized fluid to the seating tool 100, wherein a greater arc of rotation by the rear grip portion 94 translates into a smaller axial movement of the actuator shaft 58. The user may thus easily control the amount of linear actuation of the actuator shaft 58 and thus the size of the gap between the valve plug 52 and the step 85. For example, the configuration of the handle 90 permits a user to quickly engage the handle 90 to full rotation, thus permitting a large burst of pressurized fluid through the seating tool 100. The user may thus seat the bead of the tire faster, as well as having the option of quickly shutting off delivery of pressurized fluid by simply letting go of the handle 90, saving pressurized fluid in the storage tank 20 for more procedures.

It is to be understood that any feature described in relation to any one aspect may be used alone, or in combination with other features described, and may also be used in combination with one or more features of any other of the disclosed aspects, or any combination of any other of the disclosed aspects.

Figure 6:
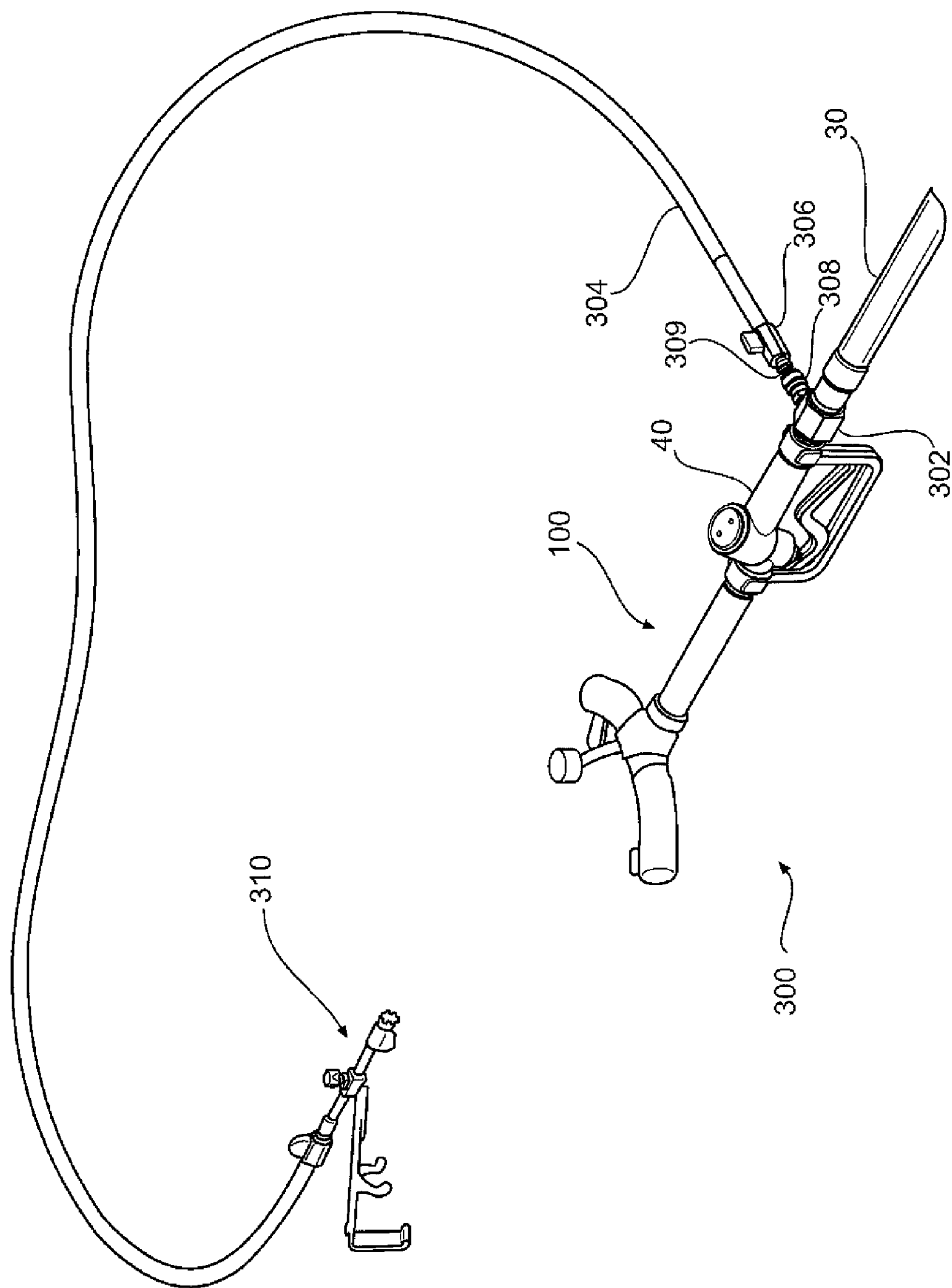
FIG. 6 is an isometric view of a bead seating system in accordance with another embodiment of the invention.
Figure 7:
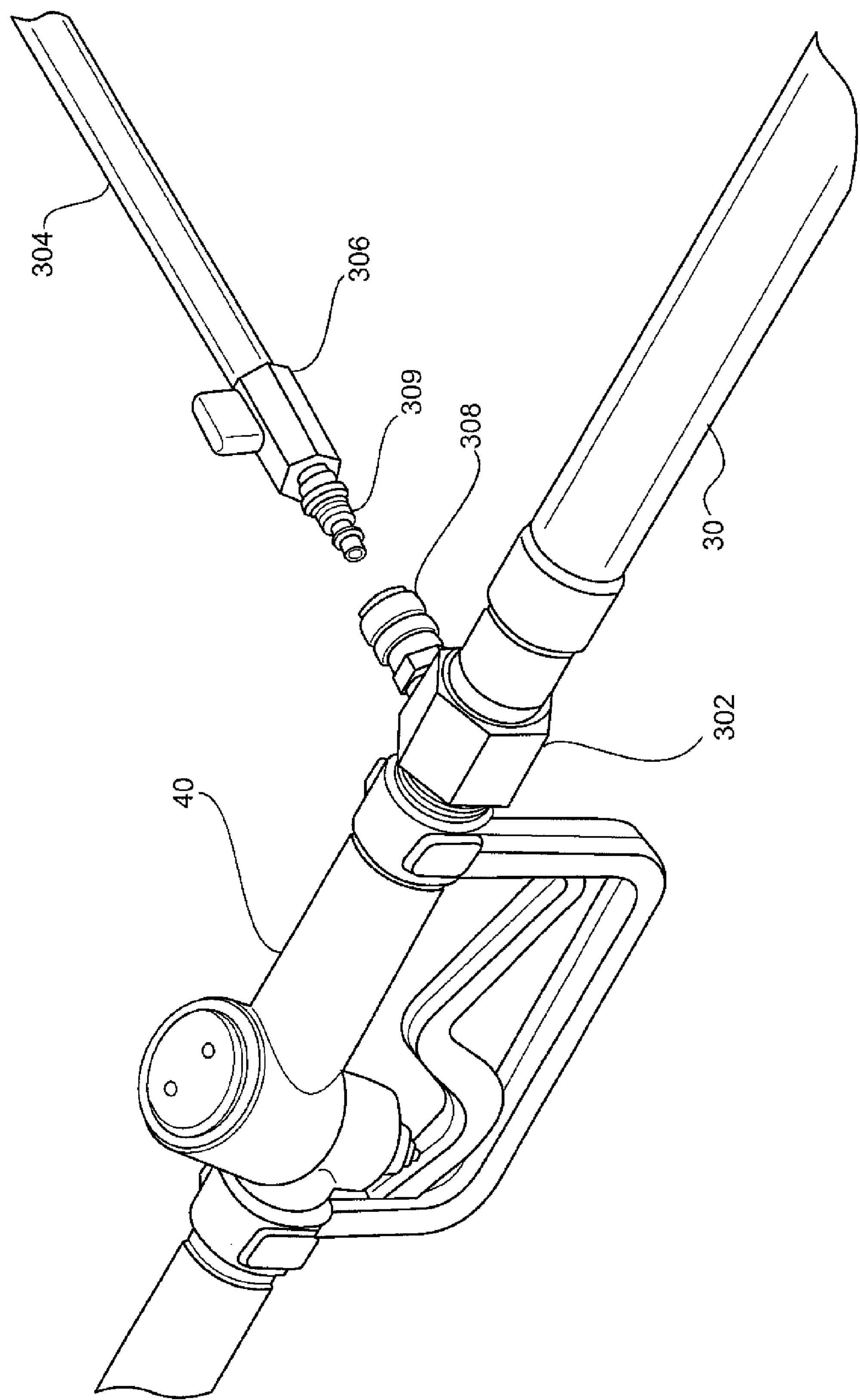
FIG. 7 is an isometric view of a portion of the bead seating system in accordance with another embodiment of the invention.

FIG. 6 illustrates another embodiment in accordance with the invention. As shown in FIG. 6, a pneumatic bead seating and tire inflating system 300 is shown. The bead seating and tire inflating system 300 includes a bead seating tool 100 and a valve assembly 40. The bead seating and tire inflating system 300 includes an accessory connector 302. The accessory connector 302 attaches to a hose connector 306 via a hose receiver 308. The hose connector 306 includes a male hose connector 309 as shown in FIG. 7.

Returning to FIG. 6, the tire bead seating and inflating system 300 is connected by a pneumatic conduit or hose 30 to an air source as previously described herein. The source may be an air compressor or air tank 20 or any other suitable source of compressed air, nitrogen, or any other suitable compressed gas.

The compressed gas flows through the pneumatic hose the 30 into the accessory connector 302. The accessory connector 302 allows the compressed gas to flow into the bead seater tool 100 via the valve assembly 40 but also allows the connection of a pneumatic accessory 310. In the embodiment shown in the FIGS. the accessory 310 is a hands-free air chuck 310. However, in other embodiments in accordance with the invention, the pneumatic accessory 310 may include other tools that use compressed gas.

The pneumatic accessory 310 is connected to the accessory connector 302 via an accessory hose 304 connected to the connectors 306, 308, and 309. The accessory connector 302 permits use of the compressed gas provided by compressed gas source to power both the bead seating tool 100 and the accessory 310. For example, in the embodiment shown, it may be useful for a mechanic to use the bead seating tool 100 to place a large amount of compressed gas into a tire 116 to seat the bead 1161 of the tire 116 onto the rim 117. Once the bead 1161 of the tire 116 is seated onto the rim 117, the mechanic may then use the hands-free air chuck 310 to inflate the tire 116 to a desired pressure.

By using the bead seating and inflating system 300 a mechanic can perform both operations of seating the tire 116 and rim 117 and inflating the tire 116 to desired pressure without having to connect and disconnect different air sources and different tools. The accessory connector 302 may be useful for placement in other type systems which require main pneumatic tool and other pneumatic tools as accessories.

FIG. 7 is a close-up partial view of the bead seating and inflating system 300 illustrated in FIG. 6. A male hose connector 309 is shown proximate to a female hose receiver 308 that is mounted to the accessory connector 302. Both the male hose connector 309 and female hose receiver 308 may be typical pneumatic connectors commonly used in the art of hose connectors. The accessory hose and connectors 306, 308, and 309 may be common hose and connectors commonly used in the art. The bead seating valve 40 may be a bead seating valve 40 described herein.

Figure 8:
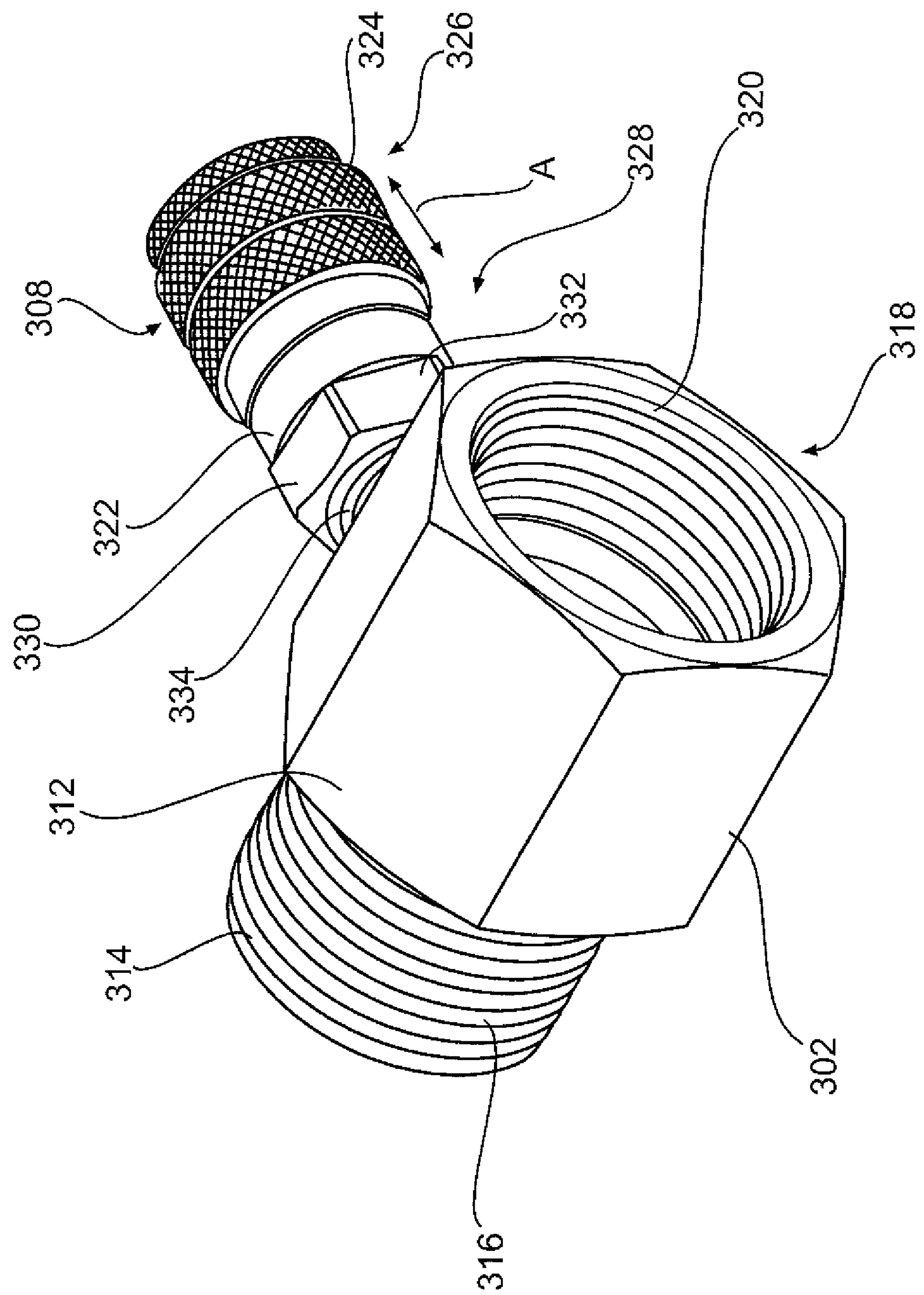
FIG. 8 is an isometric view of a pneumatic valve in accordance with an embodiment of the invention.

FIG. 8 is an isometric view of an accessory connector 302 in accordance the embodiment of the invention. The accessory connector 302 is a body that may have an exterior portion that defines hex flats 312. The hex flats 312 permit, or makes easier, the turning of the accessory connector 302. The accessory connector 302 may include an extension 314. The extension 314 provides a place for external threads 316. The external threads 316 are an example, but are not the only feature that may be used to connect things to the accessory connector 302. Other features to connect to the accessory connector 302. The accessory connector 302 defines an interior opening 318. The accessory connector 302 may include internal threads 320. The internal threads 320 also provide a way for features or other connectors to connect to the accessory connector 302.

As shown in FIG. 8, the female hose receiver 308 is connected to the accessory connector 302. The hose receiver 308 may include a locking ring 324. The locking ring 324 may have knurling 326 to facilitate a user gripping the locking ring 324. The knurling 326 may also extend to other parts of the female hose receiver 308.

In some embodiments in accordance with the invention, the locking ring 324 may be able to slide into a space 328 by sliding in the directions of arrow A. The sliding locking ring 324 may selectively lock or unlock the hose receiver 308 to the male hose connector 309. The sliding locking ring 324 maybe part of a quick connection between pneumatic connectors well known in the art. The female hose receiver 308 may include an attaching nut 330 having attaching nut flats 332 which allow the female hose receiver 308 to be tightened by a tool onto the attaching stem 334 of the accessory connector 302. The accessory connector 302 includes an attaching stem 334, which may include external threads 336 to which the attaching nut 330 is attached.

Figure 9:
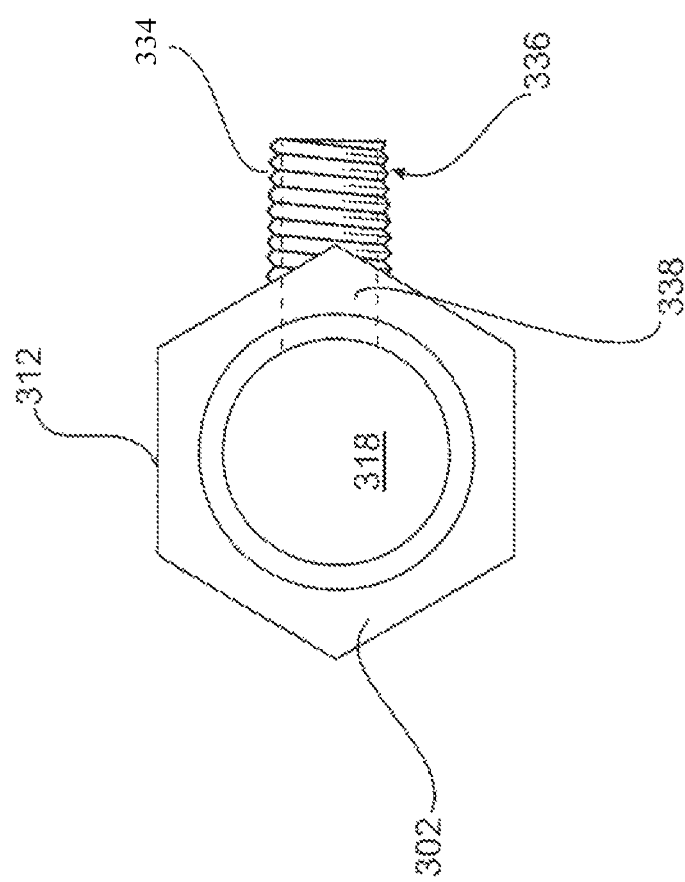
FIG. 9 is an end view of a pneumatic valve in accordance with an embodiment of the invention.

FIG. 9 illustrates an end view of the accessory connector 302. The internal opening 318 defined by the accessory connector 302 can be seen. The attaching stein 334 may include external threads 336 which provide a surface for the attaching nut 330 of the female hose receiver 308 (as shown in FIG. 8) to attach. The attaching stem 334 is hollow and is fluidly connected by a hole 338 to the opening 318 with in the accessory connector 302.

The accessory connector 302 contains at least three different connecting structures. The internal threads 320 provide one connecting structure, the external threads 316 located on the extension 314 comprise a second connecting structure, and the external threads 336 on the attaching stem 334 provide a third connecting structure. The first and second connecting structures of the internal threads 320 and the external threads 316 on the extension 314 are substantially in-line or aligned with each other.

The external threads 336 on the attaching stem 334 are located between the internal threads 320 and external threads 316 on the extension 314 and is located at an angle with respect to the internal threads 320 and external threads 316. This arrangement may provide a benefit to allowing most of the compressed fluid to flow through the opening 318 to the main pneumatic tool which in the bead seating and tire inflating system 300 is a bead seating tool 100. Some of the compressed fluid provided by the compressor or compressed fluid source may be bled off and used to power accessory 310 without interrupting the main fluid flow to the main tool 100.

All the various connecting structures on the accessory connector 302 are shown to be either external or internal threads, one of ordinary skill the art after reviewing this disclosure will understand that other connecting structures may also be used in accordance with the invention. Furthermore external and internal threads may be reversed or substituted in accordance with the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A bead seater system comprising:

a pneumatic connector comprising:

a body having two ends;

a first connecting structure at one end of the body;

a second connecting structure at the other end of the body, wherein the first and second connecting structures are substantially in line with each other;

a third connecting structure located in between the first and second connecting structures at an angle that is not in line with the first and second connecting structures, wherein the first, second and third connecting structures are fluidly connected to an interior of the body, wherein the first, second and third connecting structures are adapted to permit substantially leak free connections between pneumatic components;

a pneumatic accessory coupled to the third connecting structure;

a bead seater valve coupled to the second connecting structure; and a tire bead seater unit attached to the bead seater valve;

wherein the tire bead seater unit includes a hollow pipe closed on both ends, the pipe including a plurality of holes, the second connecting structure coupled to the pipe at a first side of the pipe and configured to introduce air into the pipe, and two or more protrusions from the pipe at a second side of the pipe, the second side being on a different side of a cross-sectional plane of the body from the first side of the pipe, a handle coupled to the pipe forming an angle of less than 90 degrees with a plane formed by the protrusions, and the handle is positioned on the pipe such that, when the two or more protrusions are positioned on a rim, a user holding the handle applies downward and forward pressures to the two or more protrusions against the rim to counteract blow back from venting of the air into the tire; and wherein the bead seater valve includes a valve plug, an actuator shaft, and an actuation control, the actuation control pivotally mounted to a body structure of the bead seater valve, wherein rotational movement of the actuation control exerts an axial force against the actuator shaft to move the valve plug through a valve cylinder portion, wherein the valve cylinder portion includes an upper valve chamber having a first internal diameter and a lower valve chamber having a second internal diameter smaller than the first internal diameter of the upper valve chamber, a step being formed at a junction of the concentrically arranged upper and lower valve chambers.

2. The bead seater system of claim 1, the pneumatic connector further comprising a compressed gas source fluidly connected to the first connecting structure.

3. The bead seater system of claim 2, wherein the pneumatic accessory is a pneumatic chuck fluidly connected to the third connecting structure.

4. The bead seater system of claim 3, wherein the pneumatic chuck is a hands free pneumatic chuck.

5. The bead seater system of claim 1, the pneumatic accessory further comprising a male pneumatic connector releasably attached to a locking ring of a female pneumatic connector of the third connecting structure, wherein the locking ring slides in an axial direction along the female pneumatic connector.

6. The bead seater system of claim 5, wherein the female pneumatic connector further comprises an attaching nut.

7. The bead seater system of claim 6, wherein the attachment nut couples the female pneumatic connector to an attachment stem of the third connecting structure.

8. The bead seater system of claim 5, wherein the pipe is formed as a bent tube with a straight portion in a middle and bent portions at each end, the pipe being closed at the bent portions, wherein when the two or more protrusions are placed on the rim, the straight portion of the pipe is closer to the tire than the bent portions of the pipe, the bent portions of the pipe are closer to the rim than the straight portion of the pipe, and wherein the plurality of holes is disposed on the second side of the pipe in each of the straight and bent portions.

9. The bead seater system of claim 1, wherein the body further comprises a hex flat with at least one flat exterior portion substantially in line with the first and second connecting structures.

10. A method of creating an accessory connection for a bead seater, comprising:

providing a connector having a first and second connecting structure substantially aligned with each other;

providing a third connecting structure located in between the first and second connecting structure and at an angle so as to not be in line with the first and second connecting structure;

fluidly connecting all three connecting structures;

releasably attaching a pneumatic accessory to the third connecting structure;

connecting one of the connecting structures to an air source and another of the connecting structures to a bead seater valve; and connecting the bead seater valve to a bead seating tool;

the bead seating tool includes a hollow pipe closed on both ends, the pipe including a plurality of holes, the second connecting structure coupled to the pipe at a first side of the pipe and configured to introduce air into the pipe, and two or more protrusions from the pipe at a second side of the pipe, the second side being on a different side of a cross-sectional plane of the body from the first side of the pipe, a handle coupled to the pipe, wherein the pipe forming an angle of less than 90 degrees with a plane formed by the protrusions, and the handle is positioned on the pipe such that, when the two or more protrusions are positioned on a rim, a user holding the handle applies downward and forward pressures to the two or more protrusions against the rim to counteract blow back from venting of the air into the tire; and wherein the bead seater valve includes a valve plug, an actuator shaft, and an actuation control, the actuation control pivotally mounted to a body structure of the bead seater valve, wherein rotational movement of the actuation control exerts an axial force against the actuator shaft to move the valve plug through a valve cylinder portion, wherein the valve cylinder portion includes an upper valve chamber having a first internal diameter and a lower valve chamber having a second internal diameter smaller than the first internal diameter of the upper valve chamber, a step being formed at a junction of the concentrically arranged upper and lower valve chambers.

11. The method of claim 10, wherein the pneumatic accessory is a pneumatic chuck.

12. The method of claim 11, wherein the pneumatic chuck is a hands-flee pneumatic chuck.

13. The method of claim 10, wherein two of the connecting structures include external threads and one of the connecting structures includes internal threads.

* * * * *